(12) United States Patent
Hsu et al.

(10) Patent No.: US 8,085,479 B2
(45) Date of Patent: Dec. 27, 2011

(54) OPTICAL ZOOM LENS MODULE AND IMAGE CAPTURING DEVICE USING SAME

(75) Inventors: Te-Lun Hsu, Taipei Hsien (TW); Chun-Hsiang Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 192 days.

(21) Appl. No.: 12/510,286

(22) Filed: Jul. 28, 2009

(65) Prior Publication Data

US 2010/0315722 A1   Dec. 16, 2010

(30) Foreign Application Priority Data

Jun. 10, 2009   (CN) .......................... 2009 1 0303127

(51) Int. Cl.
*G02B 15/14* (2006.01)
(52) U.S. Cl. ....................................... 359/687; 359/676

(58) Field of Classification Search .......... 359/680–682, 359/676, 687
See application file for complete search history.

(56) References Cited

U.S. PATENT DOCUMENTS

2005/0259332 A1* 11/2005 Noguchi et al. .............. 359/680
* cited by examiner

*Primary Examiner* — James Greece
(74) *Attorney, Agent, or Firm* — Altis Law Group, Inc.

(57) ABSTRACT

An optical zoom lens module includes, in this order from the object side to the image side thereof, a first lens group of positive refraction power, a second lens group of negative refraction power, a third lens group of positive refraction power, and a fourth lens group of positive refraction power. The optical zoom lens module satisfies the formula: 12<TTL/FW<16, and 6<F1/F<8, where TTL is the total length of the optical zoom lens module, FW is the smallest effective focal length of the optical zoom lens module, F1 is the effective focal length of the first lens group, and F is the effective focal length of the optical zoom lens module.

10 Claims, 21 Drawing Sheets

OPTICAL ZOOM LENS MODULE AND IMAGE CAPTURING DEVICE USING SAME

BACKGROUND

1. Technical Field

The present disclosure relates to optical technology and, particularly, relates to an optical zoom lens module with short overall length and an image capturing device using the same.

2. Description of Related Art

In recent years, resolution of image sensing chips has increased, while size of the image sensing chips has decreased. Therefore, it has become desirable to develop an optical zoom lens module with a short overall length and with an optical performance that matches image sensing chips with enhanced resolution.

DETAILED DESCRIPTION

Figure 1:
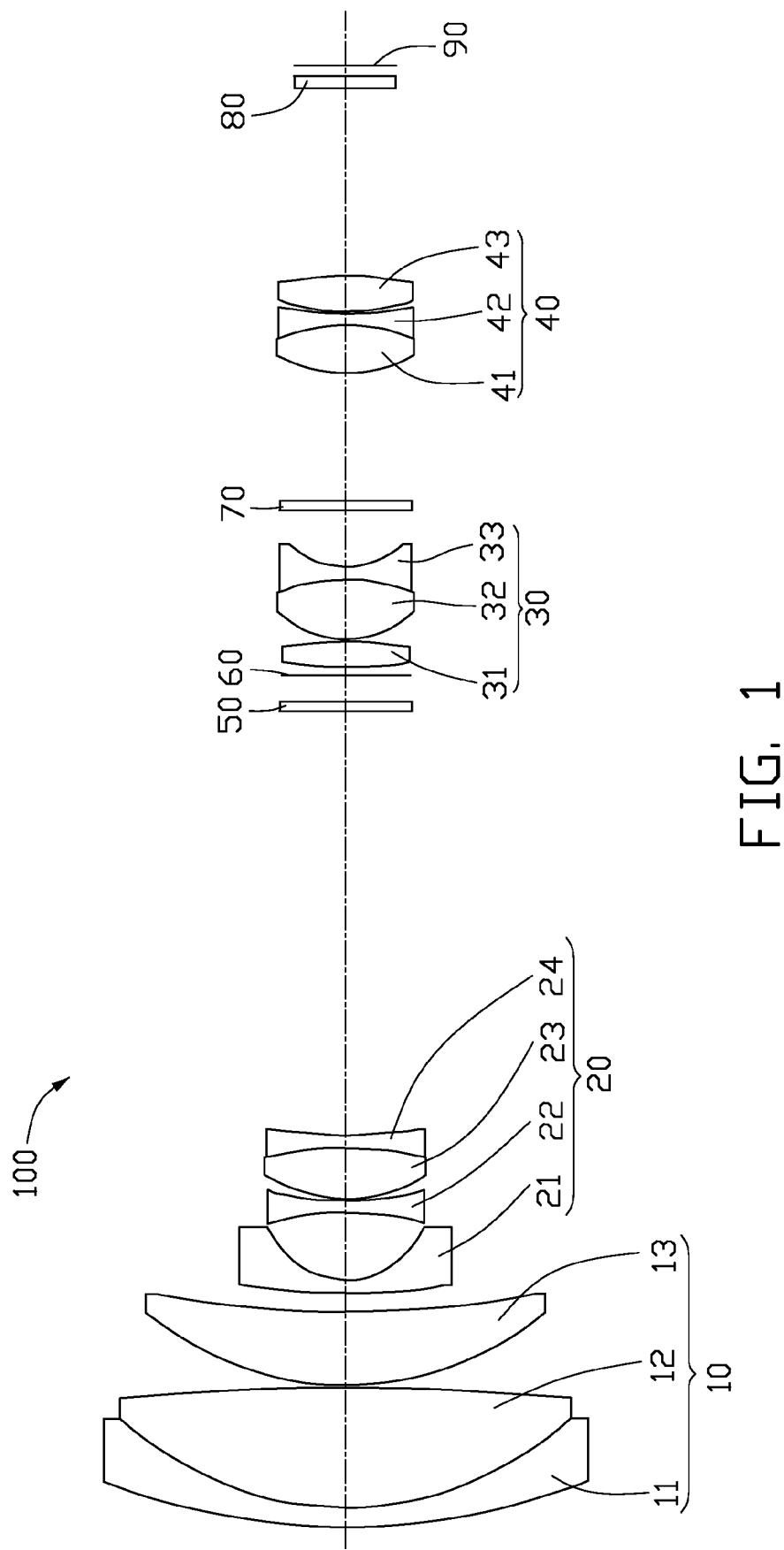
FIG. 1 is a schematic view of an optical zoom lens module for use in image capturing device, which is in the wide angle state thereof, according to an embodiment.
Figure 2:
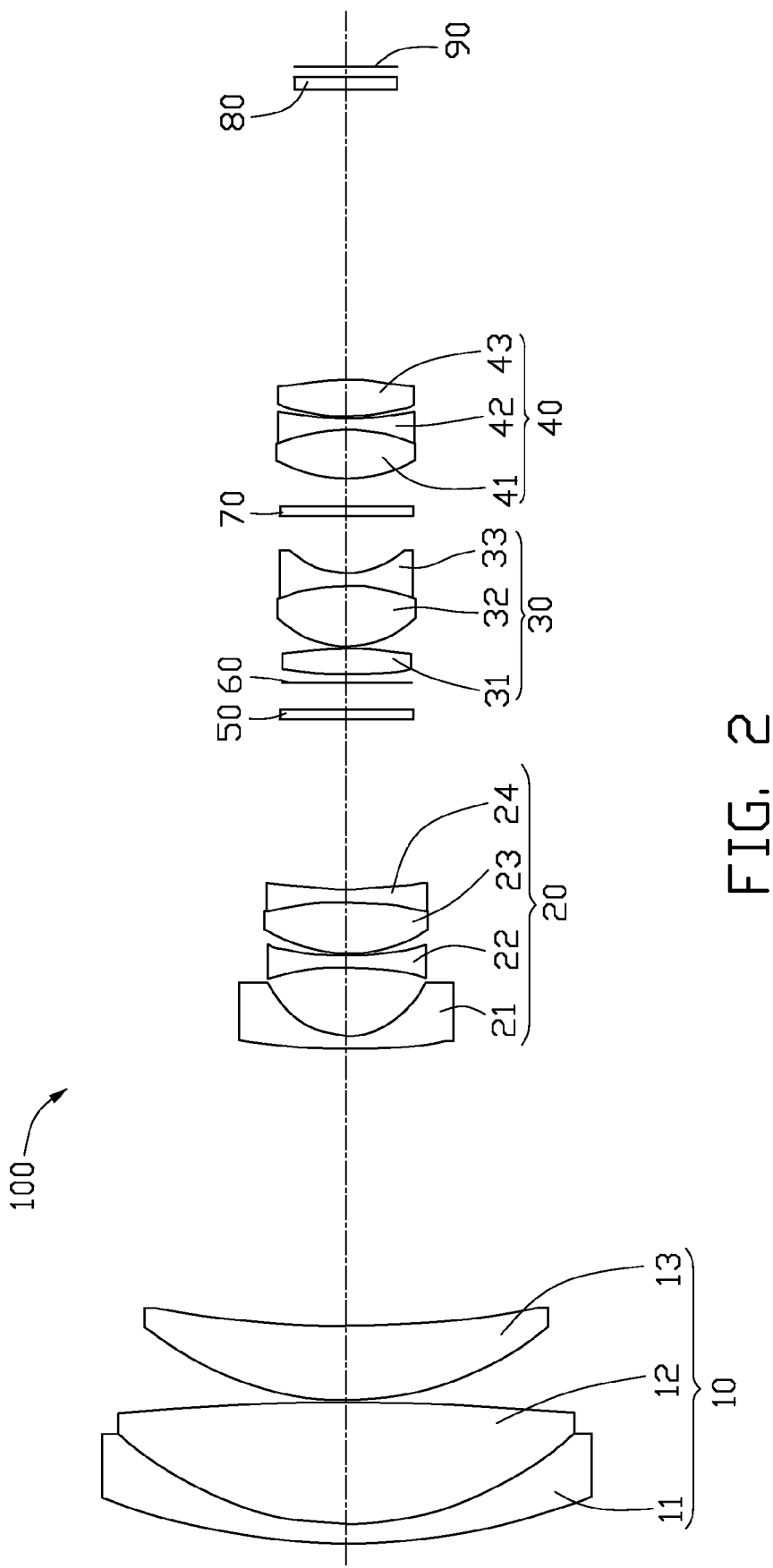
FIG. 2 is a schematic view of the optical zoom lens module of FIG. 1, which is in the middle state thereof.
Figure 3:
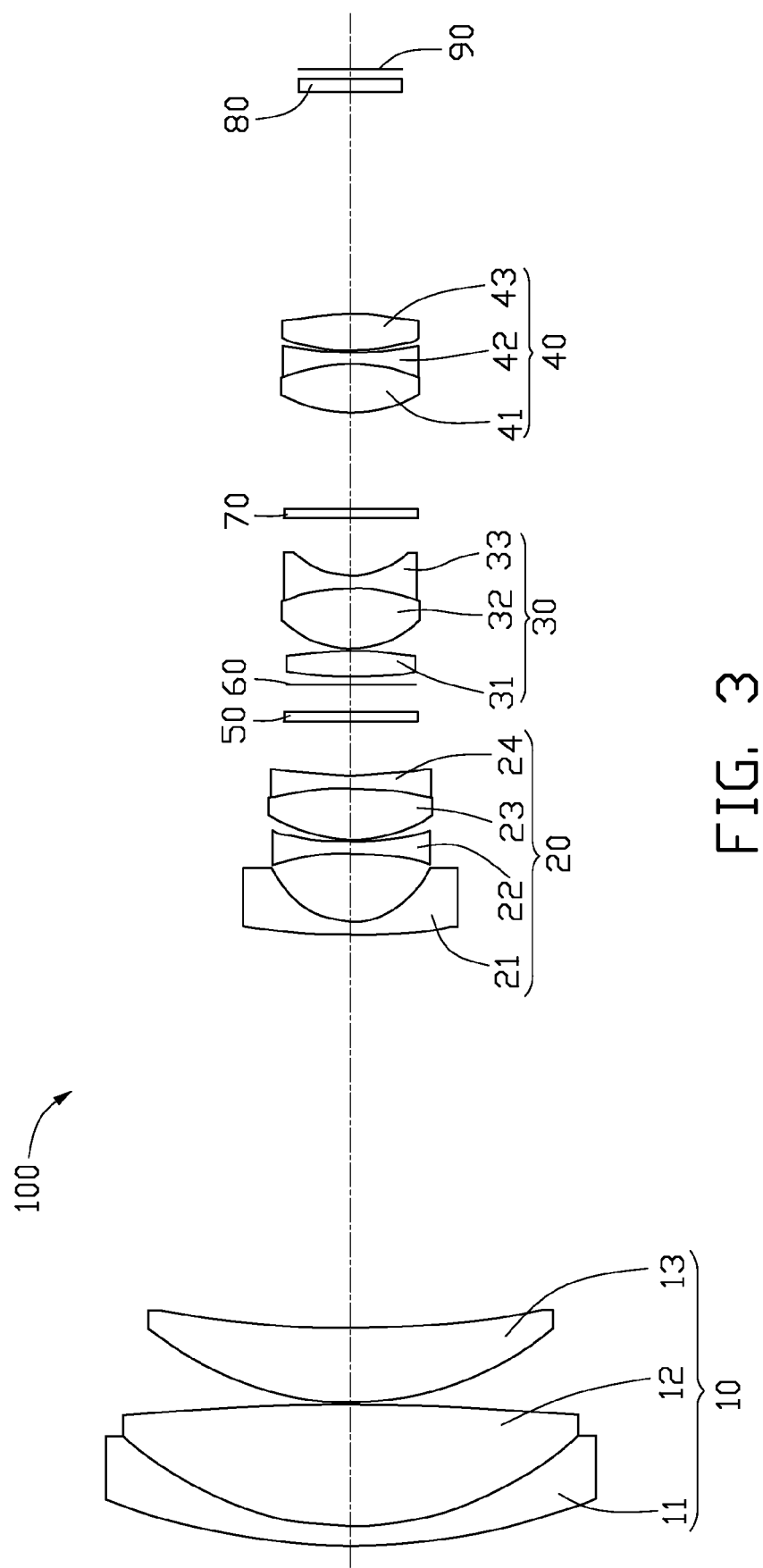
FIG. 3 is a schematic view of the optical zoom lens module of FIG. 1, which is in the telephoto state thereof.

Referring to FIGS. 1 to 3, an optical zoom lens module 100, according to an exemplary embodiment, includes, in this order from the object side to the image side thereof, a first lens group 10, a second lens group 20, a third lens group 30, and a fourth lens group 40. The first lens group 10, the third lens group 30, and the fourth lens group 40 have a positive refraction power, while the second lens group 20 has a negative refraction power. The optical zoom lends module 100 can be used for an image capturing device, such as a digital camera.

The optical zoom lens module 100 further includes a light-reducing plate 50, an aperture stop 60, an infrared cut filter 70, and a glass cover 80. The light-reducing plate 50 is positioned between the second lens group 20 and the third lens group 30 to reduce certain amount of incident light. The aperture stop 69 is positioned between the light-reducing plate 50 and the third lens group 30. The infrared cut filter 70 is positioned between the third lens group 30 and the fourth lens group 40. The glass cover 80 is positioned between the infrared cut filter 70 and an imaging plane 90. When capturing an image, the incident light enters the optical zoom lens module 100, and finally is focused onto the imaging plane 90 to form an image. When the optical zoom lens module 100 focuses, the second lens group 20 and the fourth lens group 40 are movable along the optical axis of the optical zoom lens module 100.

Specifically, the first lens group 10 includes, in this order from the object side to the image side of the optical zoom lens module 100, a first lens 11 having negative refraction power, a second lens 12 having positive refraction power, and a third lens 13 having positive refraction power. The first lens 11, the second lens 12, and the third lens 13 can be spherical lenses. The lenses 11, 12 are secured together via glue to correct color aberration of the optical zoom lens module 100.

The second lens group 20 includes, in this order from the object side to the image side of the optical zoom lens module 100, a fourth lens 21 having negative refraction power, a fifth lens 22 having negative refraction power, a sixth lens 23 having positive refraction power, and a seventh lens 24 having negative refraction power. The fourth lens 21, the fifth lens 22, the sixth lens 23 and the seventh lens 24 are spherical lenses. The lenses 24, 23 are secured together via glue to correct color aberration of the optical zoom lens module 100.

The third lens group 30 includes, in this order from the object side to the image side of the optical zoom lens module 100, an eighth lens 31 having positive refraction power, a ninth lens 32 having positive refraction power, and a tenth lens 33 having negative refraction power. The object-side surface and the image-side surface of the eighth lens 31 are aspherical. The ninth lens 32 and the tenth lens 33 are spherical lenses. The lenses 33, 32 are secured together via glue to correct color aberration of the optical zoom lens module 100.

The fourth lens group 40 includes, in this order from the object side to the image side of the optical zoom lens module 100, an eleventh lens 41 having positive refraction power, a twelfth lens 42 having negative refraction power, and a thirteenth lens 43 having positive refraction power. The object-side surface and the image-side surface of the thirteenth lens 43 are aspherical. The eleventh lens 41 and the twelfth lens 42 are spherical lenses. The lenses 42, 41 are secured together via glue to correct color aberration of the optical zoom lens module 100.

The optical zoom lens module 100 satisfies the formulas of: (1) $12<TTL/FW<16$; and (2) $6<F1/F<8$, where TTL is the total length of the optical zoom lens module 100, FW is the smallest effective focal length of the optical zoom lens module 100, i.e., the effective focal length of the optical zoom lens module 100 in the wide angle state, F1 is the effective focal length of the first lens group 10, and F is the effective focal length of the optical zoom lens module 100.

The formula (1) ensures the optical zoom lens module 100 has a minimal overall length. The formula (2) ensures the optical zoom lens module 100 to limit the back focal length of the optical zoom lens module 100 to a proper length, thereby allowing other optical lens groups of the optical zoom lens module 100 to be installed therein.

In order to fix color aberration of the optical zoom lens module 100, the optical zoom lens module 100 further satisfies the formula: (3) $30<(v2-v1)<60$, where v1 is the Abbe number of the first lens 11 and v2 is the Abbe number of the second lens 12.

In order to control spherical aberration of the optical zoom lens module 100 in the telephoto state thereof, the optical zoom lens module 100 further satisfies the formula: (4) $-3<[ra+rb/ra-rb]<-1$, where ra is the curvature radius of the object-side surface of the third lens 13, and rb is the curvature radius of the image-side surface of the third lens 13.

Detailed examples of the optical zoom lens module 100 are given below in company with FIGS. 4-21, but it should be noted that the optical zoom lens module 100 is not limited by these examples. In the given detailed examples, the object-side surfaces and the image-side surfaces of the eighth lens 31, and the thirteenth lens 43 are aspherical.

The aspherical surface is shaped according to the formula:

$$x = \frac{ch^2}{1+\sqrt{1-(k+1)c^2h^2}} + \Sigma A_i h^i,$$

where h is a height from the optical axis of the optical zoom lens 100 module to the aspherical surface, c is a vertex curvature, k is a conic constant, and Ai are i-th order correction coefficients of the aspherical surfaces.

Listed below are the symbols used in these detailed examples:

F: effective focal length of the optical zoom lens module 100;

$F_{No}$: F number;

2ω: field angle;

R: radius of curvature;

D: distance between surfaces on the optical axis of the optical zoom lens module 100;

Nd: refractive index of lens;

v: Abbe constant;

D5: distance between the image-side surface of the third lens 13 and the object-side surface of the fourth lens 21 on the optical axis of the optical zoom lens module 100;

D12: distance between the image-side surface of the seventh lens 24 and the object-side surface of the light reducing plate 50 on the optical axis of the optical zoom lens module 100;

D21: distance between the image-side surface of the infrared cut filter 70 and object-side surface of the eleventh lens 41 on the optical axis of the optical zoom lens module 100; and D26: distance between the image-side surface of the thirteenth lens 43 and the object-side surface of the glass cover 80 on the optical axis of the optical zoom lens module 100.

Example 1

Tables 1-4 show the lens data of Example 1.

TABLE 1

| Coefficient | Wide angle state | Middle state | Telephoto state |
|---|---|---|---|
| F | 4.67 mm | 21.48 mm | 44.41 mm |
| $F_{No}$ | 1.95 | 2.4 | 3.5 |
| 2ω | 67.6° | 15.7° | 7.61° |

TABLE 2

| Surface | R (mm) | D (mm) | Nd | v |
|---|---|---|---|---|
| Object-side surface of the first lens 11 | 51.91 | 0.9 | 1.85 | 23.8 |
| Image-side surface of the first lens 11 and object-side surface of the second lens 12 | 24.66 | 5.64 | 1.49 | 70.2 |
| Image-side surface of the second lens 12 | −191.79 | 0.1 | — | — |
| Object-side surface of the third lens 13 | 23.23 | 3.47 | 1.8 | 46.6 |

TABLE 2-continued

| Surface | R (mm) | D (mm) | Nd | v |
|---|---|---|---|---|
| Image-side surface of the third lens 13 | 82.14 | D5 (see table 4) | — | — |
| Object-side surface of the fourth lens 21 | 53.84 | 0.6 | 1.88 | 40.8 |
| Image-side surface of the fourth lens 21 | 5.89 | 3.17 | — | — |
| Object-side surface of the fifth lens 22 | −23.37 | 0.55 | 1.77 | 49.6 |
| Image-side surface of the fifth lens 22 | 23.37 | 0.1 | — | — |
| Object-side surface of the sixth lens 23 | 11.28 | 2.4 | 1.85 | 23.8 |
| Image-side surface of the sixth lens 23 and object-side surface of the seventh lens 24 | −26.35 | 0.6 | 1.83 | 42.7 |
| Image-side surface of the seventh lens 24 | 36.93 | D12 (see table 4) | — | — |
| Object-side surface of the light reducing plate 50 | infinite | 0.2 | 1.52 | 64.2 |
| Image-side surface of the light reducing plate 50 | infinite | 0.1 | — | — |
| The surface of aperture stop 60 | infinite | 0.2 | — | — |
| Object-side surface of the eighth lens 31 | 46.88 | 1.21 | 1.52 | 64.1 |
| Image-side surface of the eighth lens 31 | −21.72 | 0.1 | — | — |
| Object-side surface of the ninth lens 32 | 7.23 | 2.82 | 1.75 | 52.3 |
| Image-side surface of the ninth lens 32 and object-side surface of the tenth lens 33 | −13.59 | 0.6 | 1.8 | 42.2 |
| Image-side surface of the tenth lens 33 | 6.43 | 2.65 | — | — |
| Object-side surface of the infrared cut filter 70 | infinite | 0.4 | 1.52 | 64.2 |
| Image-side surface of the infrared cut filter 70 | infinite | D21 (see table 4) | — | — |
| Object-side surface of the eleventh lens 41 | 10.72 | 2.24 | 1.59 | 61.1 |
| Image-side surface of the eleventh lens 41 and object-side surface of the twelfth lens 42 | −14.04 | 0.55 | 1.73 | 28.5 |
| Image-side surface of the twelfth lens 42 | 26.3 | 0.1 | — | — |
| Object-side surface of the thirteenth lens 43 | 18.68 | 1.7 | 1.52 | 64.1 |
| Image-side surface of the thirteenth lens 43 | −16.98 | D26 (see table 4) | — | — |
| Object-side surface of the glass cover 80 | infinite | 0.55 | 1.52 | 64.2 |
| Image-side surface of the glass cover 80 | infinite | 0.2 | — | — |
| Imaging plate 90 | infinite | — | — | — |

TABLE 3

| Surface | Aspherical coefficient |
|---|---|
| Object-side surface of the eighth lens 31 | K = 1.088900E+02; A4 = −5.760000E−05; A6 = 8.290000E−06; A8 = −8.740000E−07; A10 = 1.200000E−07; A12 = −3.160000E−09; |
| Image-side surface of the eighth lens 31 | K = −2.754000E+01; A4 = −1.640000E−04; A6 = 1.060000E−05; A8 = 7.310000E−07; A10 = −1.410000E−08; A12 = 1.510000E−09; |
| Object-side surface of the thirteenth lens 43 | K = −5.070000E+00; A4 = 1.570000E−04; A6 = 1.130000E−05; A8 = −2.390000E−07; A10 = 3.170000E−08; A12 = 2.360000E−10; |
| Image-side surface of the thirteenth lens 43 | K = −4.460000E+00; A4 = 2.010000E−04; A6 = 1.430000E−05; A8 = −3.370000E−07; A10 = 3.120000E−08; A12 = 6.410000E−10; |

TABLE 4

| Variable coefficient | Wide angle state | Middle state | Telephoto state |
|---|---|---|---|
| D5 | 0.90 | 15.74 | 20.41 |
| D12 | 21.53 | 6.68 | 2.02 |

TABLE 4-continued

| Variable coefficient | Wide angle state | Middle state | Telephoto state |
|---|---|---|---|
| D21 | 6.04 | 1.76 | 3.09 |
| D26 | 8.93 | 13.21 | 11.88 |

Figure 4:
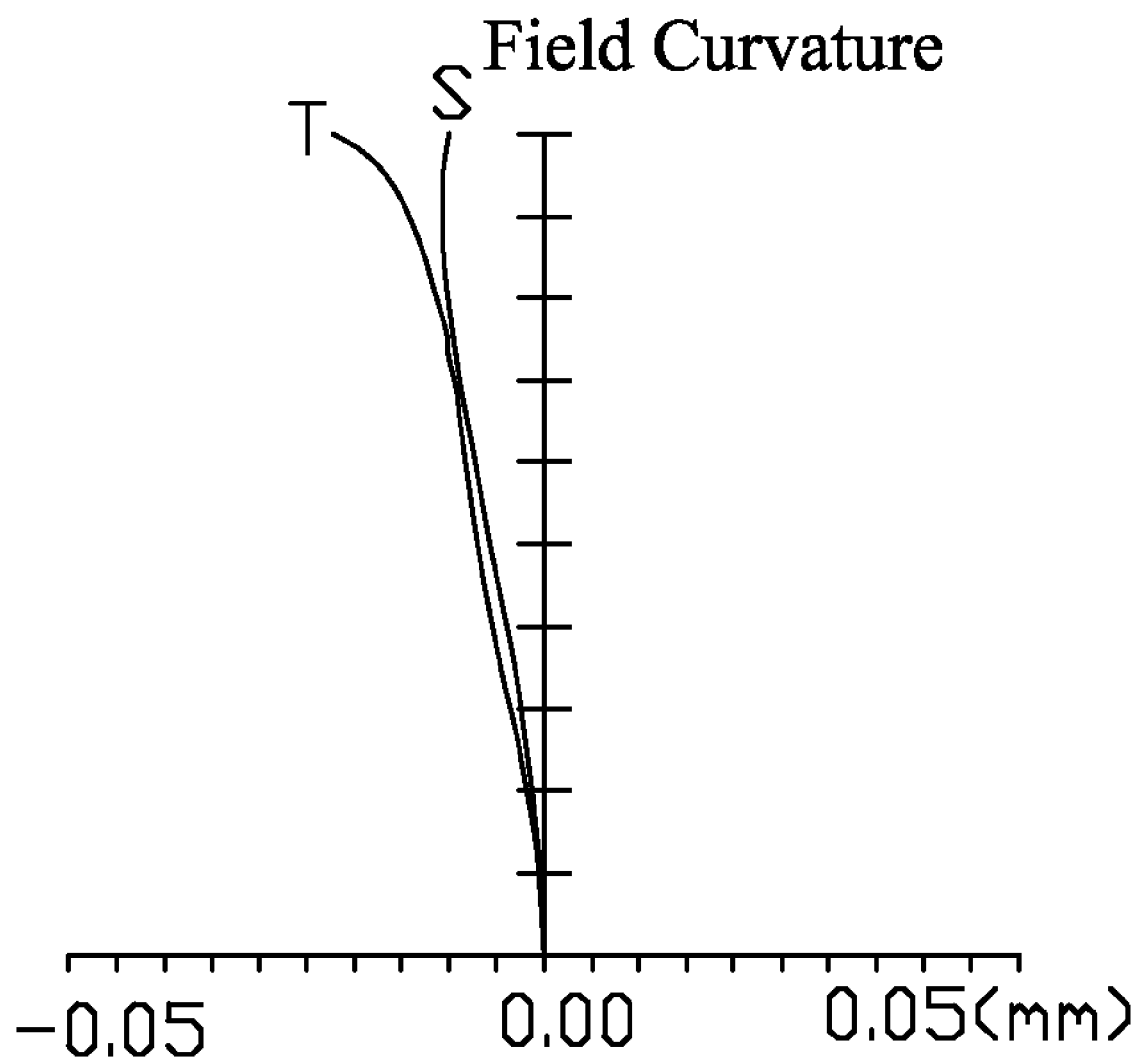
FIGS. 4~6 are graphs respectively showing field curvature, distortion and spherical aberration occurring in the optical zoom lens module in the wide angle state as in FIG. 1. according to a first exemplary implementation.
Figure 5:
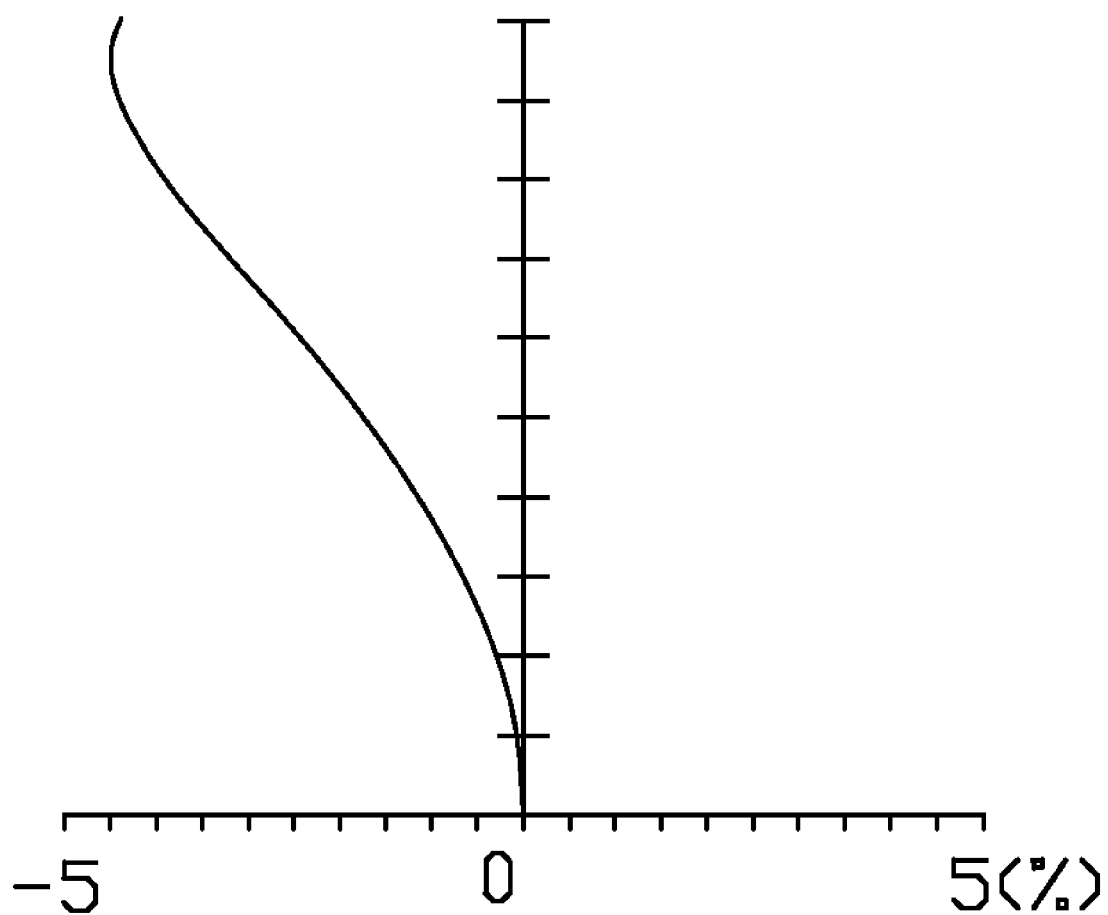
Figure 6:
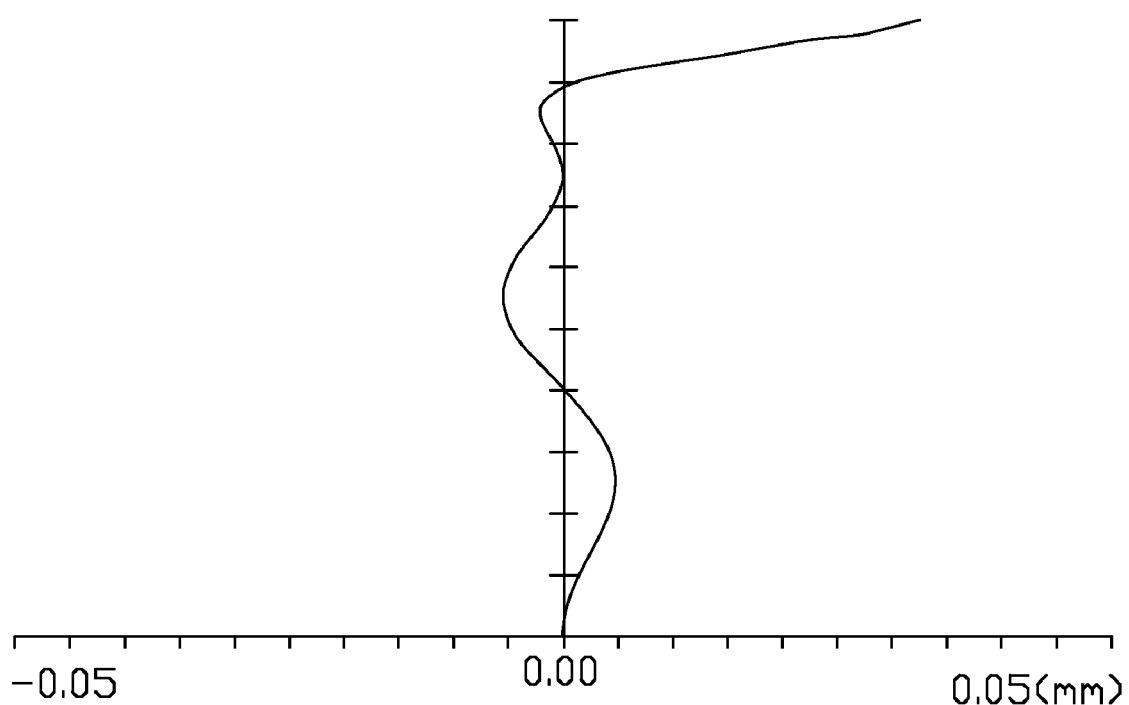

When the optical zoom lens module 100 is in wide angle state, in FIG. 4, the curves t, s are the tangential field curvature curve and the sagittal field curvature curve respectively. Clearly, field curvature occurring in the optical zoom lens module 100 of Example 1 is limited to a range of: −0.05 mm~0.05 mm. In FIG. 5, distortion occurring in the optical zoom lens module 100 of Example 1 is limited to be within the range of: −5%~5%. In FIG. 6, spherical aberration occurring in the optical zoom lens module 100 of Example 1 is limited in a range of −0.05 mm~0.05 mm.

Figure 7:
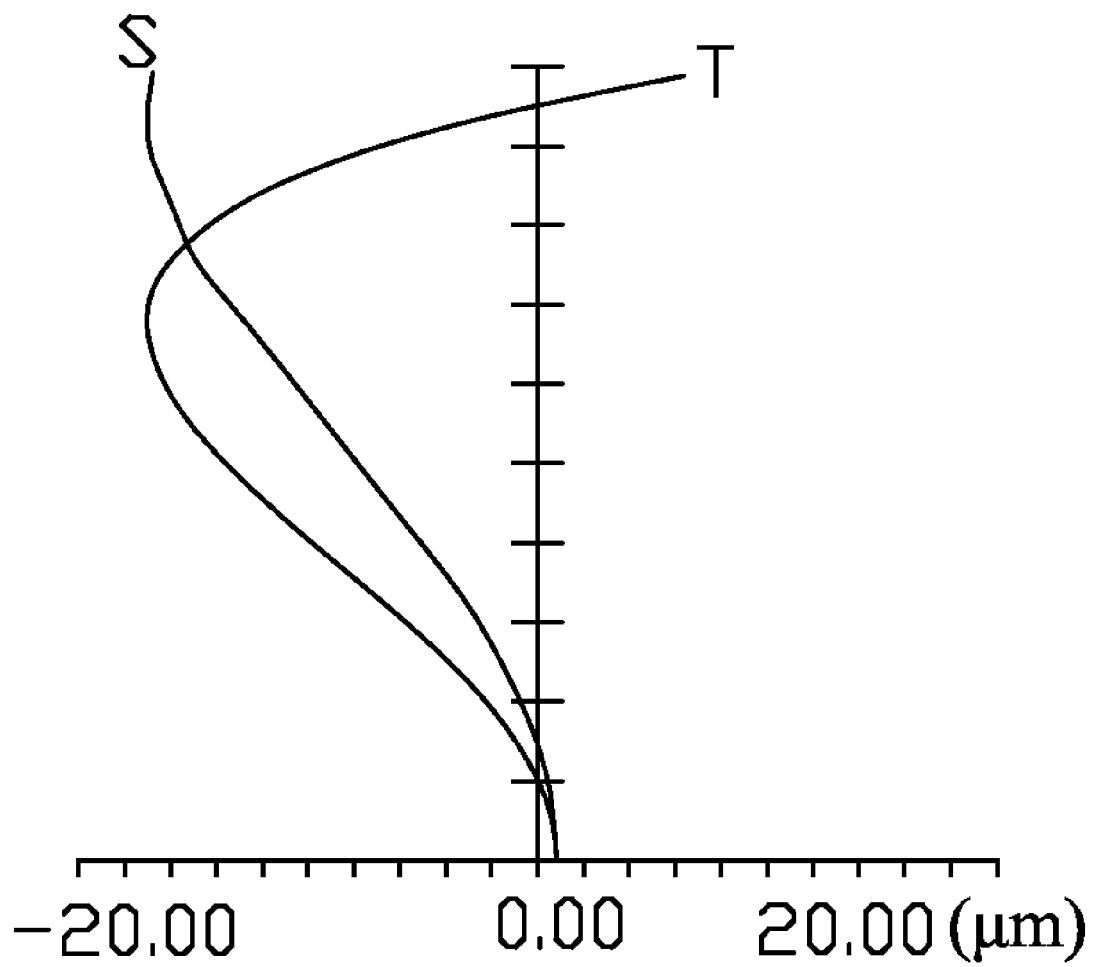
FIGS. 7~9 are graphs respectively showing field curvature, distortion, and spherical aberration occurring in the optical zoom lens module that is in the middle state as in FIG. 2, according to the first exemplary implementation.
Figure 8:
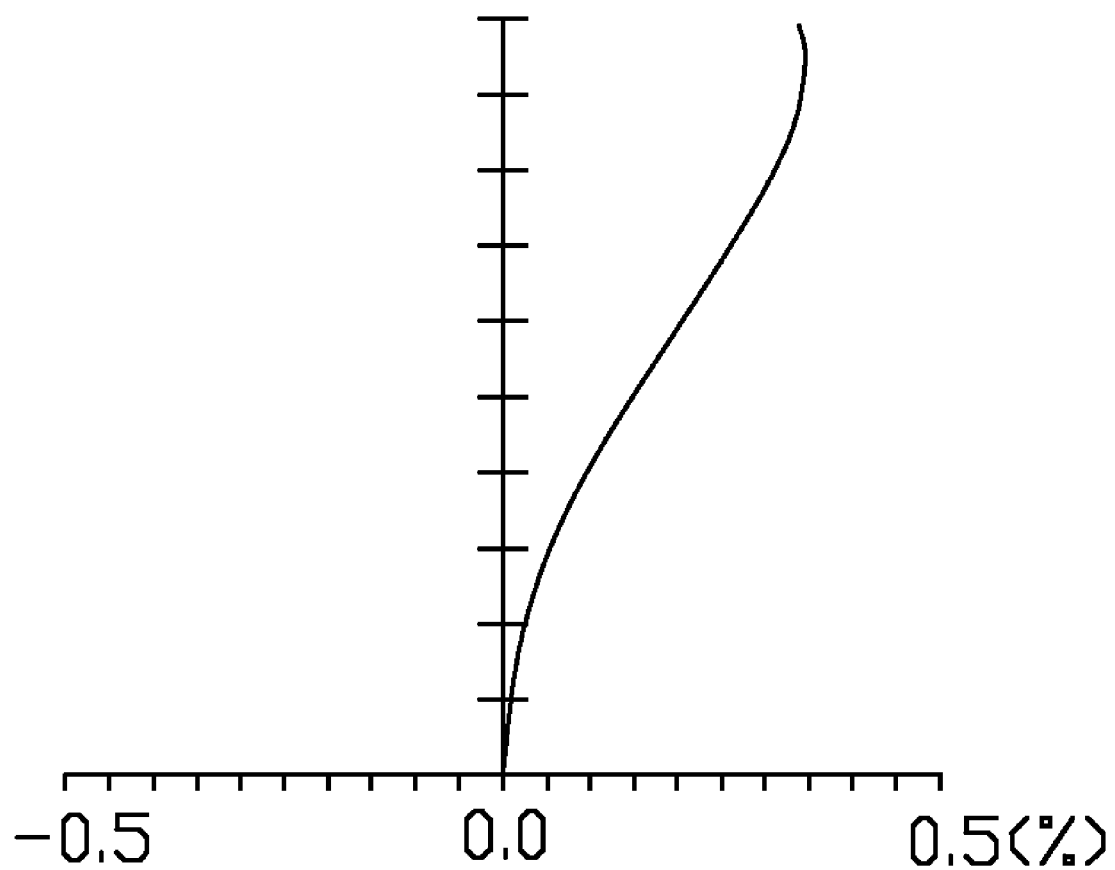
Figure 9:
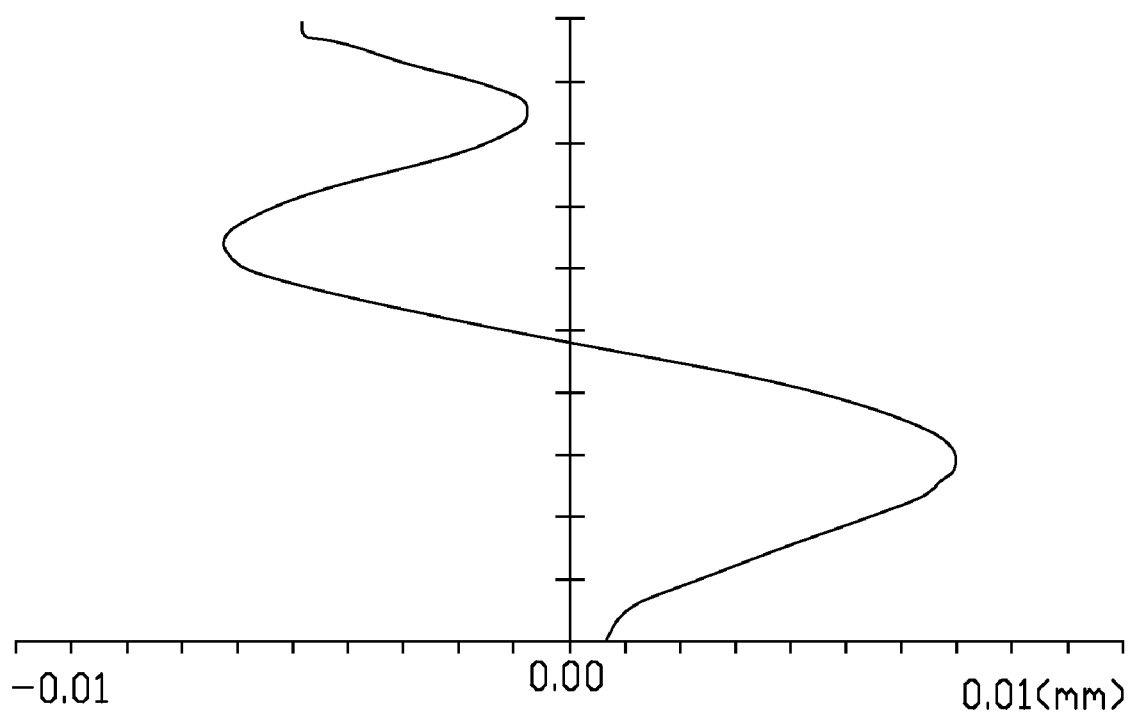

When the optical zoom lens module 100 is in middle state, in FIG. 7, the curves t, s are the tangential field curvature curve and the sagittal field curvature curve respectively. Clearly, field curvature occurring in the optical zoom lens module 100 of Example 1 is limited to a range of: −20 μm~20 μm. In FIG. 8, distortion occurring in the optical zoom lens module 100 of Example 1 is limited to be within the range of: −0.5%~0.5%. In FIG. 9, spherical aberration occurring in the optical zoom lens module 100 of Example 1 is limited in a range of −0.01 mm~0.01 mm.

Figure 10:
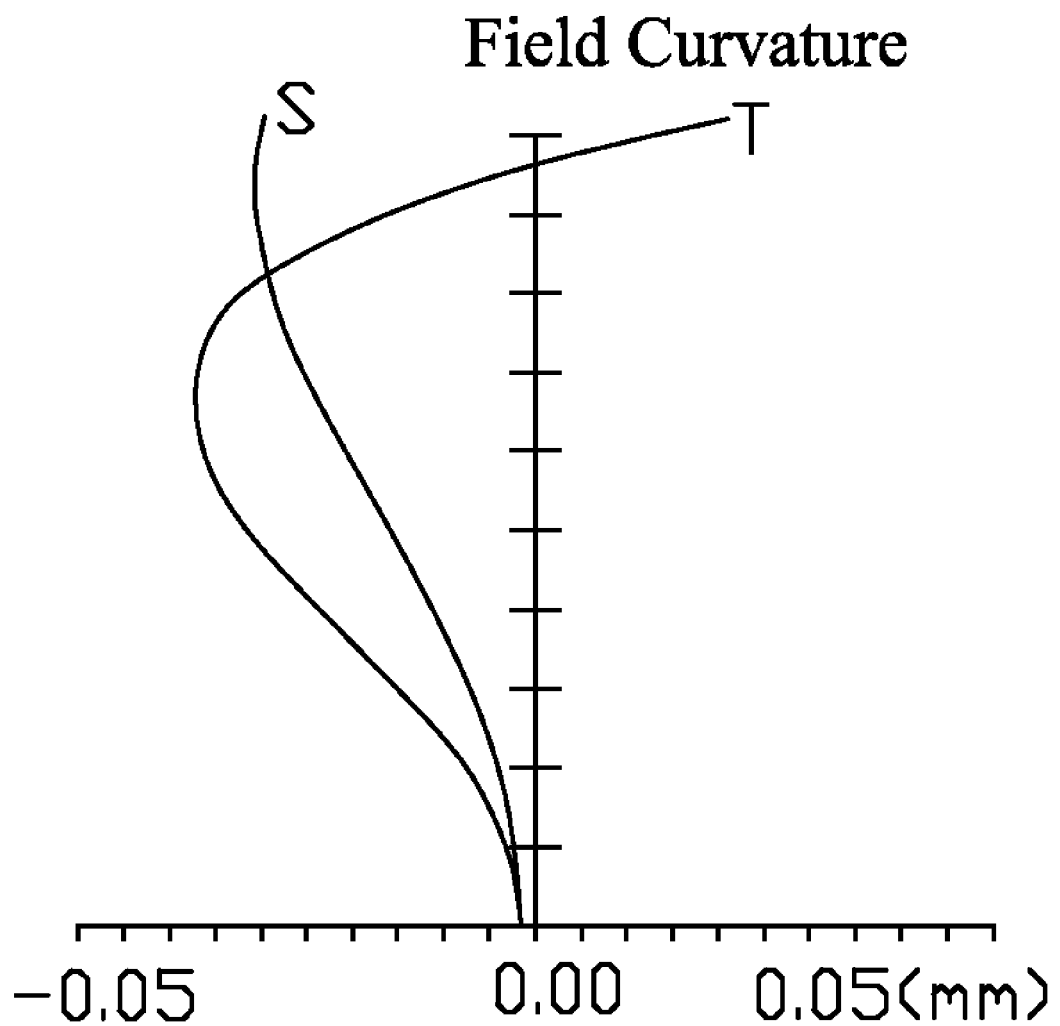
FIGS. 10~12 are graphs respectively showing field curvature, distortion, and spherical aberration occurring in the optical zoom lens module in the telephoto state as in FIG. 3, according to the first exemplary implementation.
Figure 11:
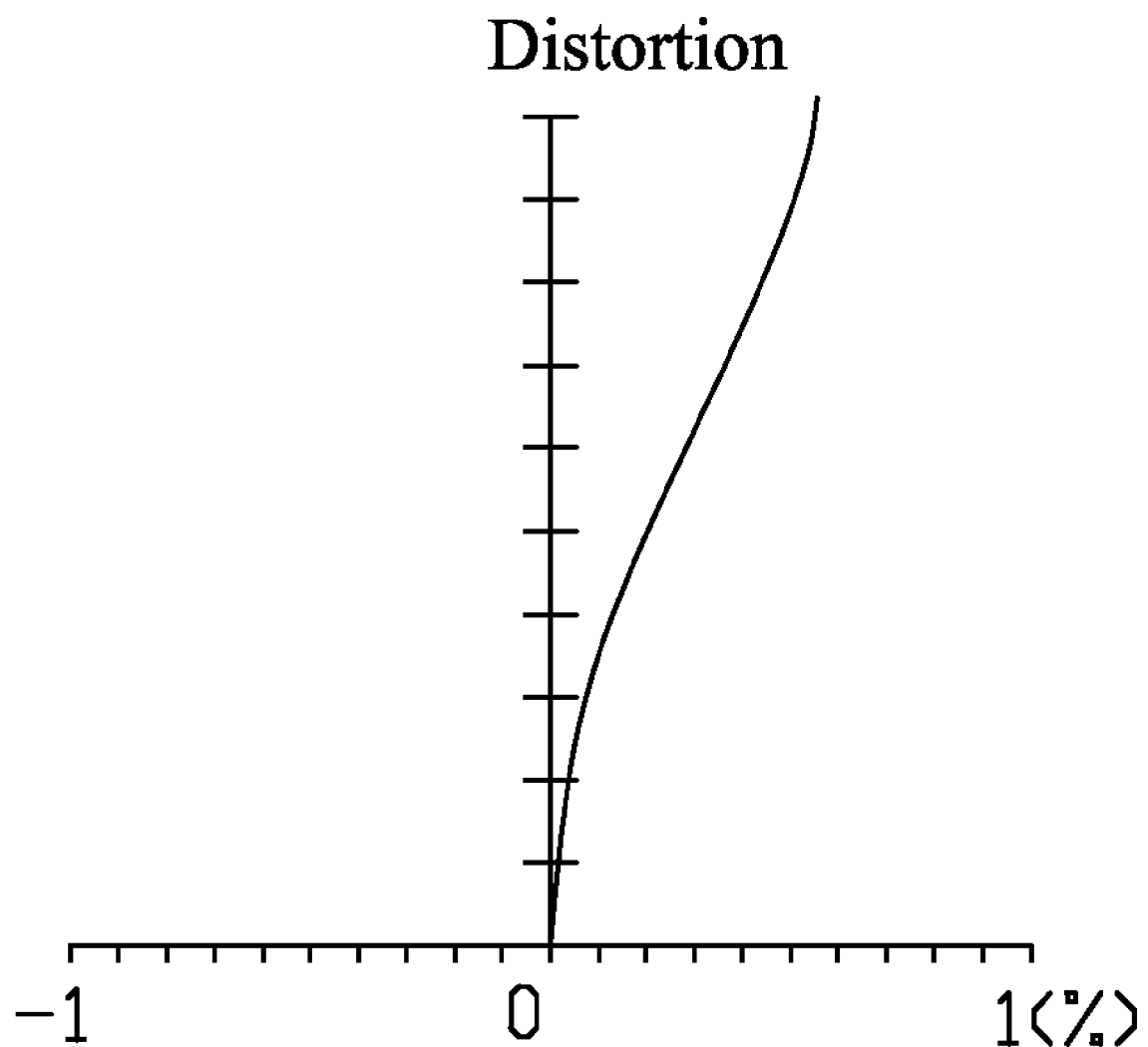
Figure 12:
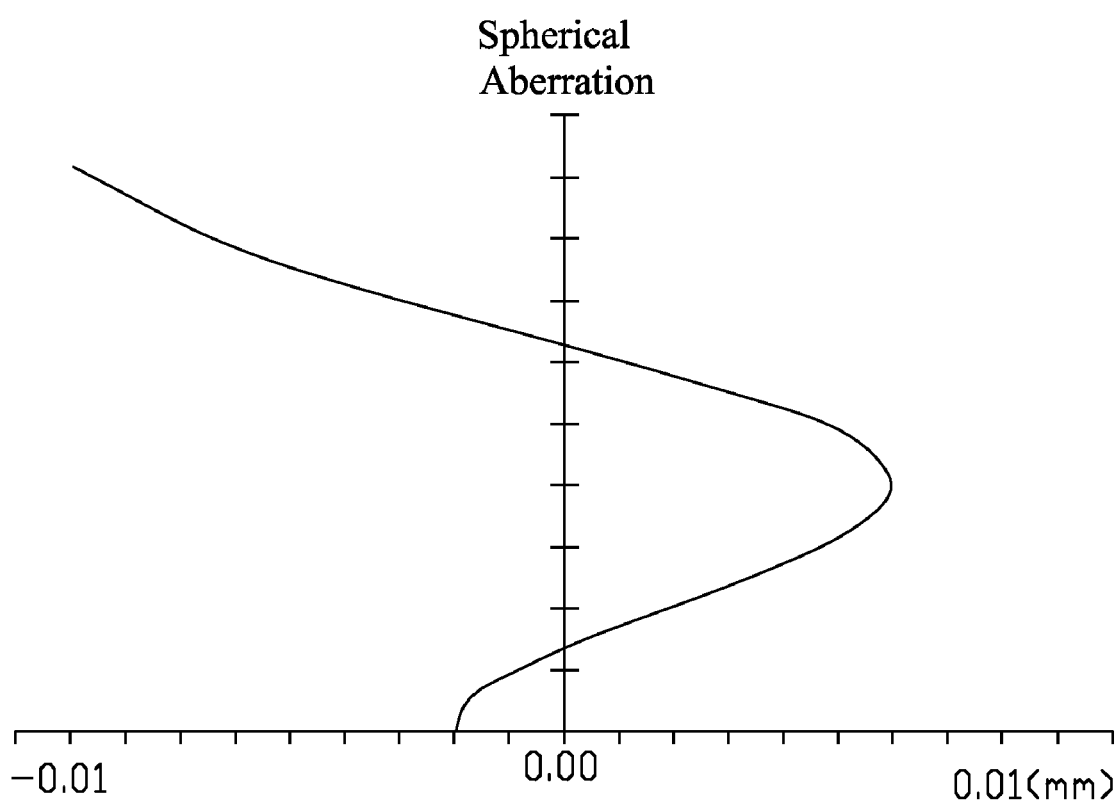

When the optical zoom lens module 100 is in telephoto state, in FIG. 10, the curves t, s are the tangential field curvature curve and the sagittal field curvature curve respectively. Clearly, field curvature occurring in the optical zoom lens module 100 of Example 1 is limited to a range of: −0.05 mm~0.05 mm. In FIG. 11, distortion occurring in the optical zoom lens module 100 of Example 1 is limited to be within the range of: −1%~1%. In FIG. 12, spherical aberration occurring in the optical zoom lens module 100 of Example 1 is limited in a range of −0.01 mm~0.01 mm.

Example 2

Tables 5-8 show the lens data of Example 2.

TABLE 5

| Coefficient | Wide angle state | Middle state | Telephoto state |
|---|---|---|---|
| F | 4.68 mm | 16.67 mm | 34.26 mm |
| $F_{No}$ | 1.8 | 2.4 | 3.5 |
| 2ω | 67.8° | 20.19° | 9.7° |

TABLE 6

| Surface | R (mm) | D (mm) | Nd | v |
|---|---|---|---|---|
| Object-side surface of the first lens 11 | 51.11 | 0.90 | 1.85 | 23.8 |
| Image-side surface of the first lens 11 and object-side surface of the second lens 12 | 24.46 | 5.56 | 1.49 | 70.2 |
| Image-side surface of the second lens 12 | −216.61 | 0.10 | — | — |
| Object-side surface of the third lens 13 | 23.19 | 3.46 | 1.8 | 46.6 |
| Image-side surface of the third lens 13 | 82.08 | D5 (see table 8) | — | — |
| Object-side surface of the fourth lens 21 | 53.87 | 0.60 | 1.88 | 40.8 |
| Image-side surface of the fourth lens 21 | 5.88 | 3.15 | — | — |
| Object-side surface of the fifth lens 22 | −22.69 | 0.60 | 1.77 | 49.6 |
| Image-side surface of the fifth lens 22 | 24.15 | 0.10 | — | — |
| Object-side surface of the sixth lens 23 | 11.36 | 2.38 | 1.85 | 23.8 |

TABLE 6-continued

| Surface | R (mm) | D (mm) | Nd | v |
|---|---|---|---|---|
| Image-side surface of the sixth lens 23 and object-side surface of the seventh lens 24 | −25.53 | 0.60 | 1.83 | 42.7 |
| Image-side surface of the seventh lens 24 | 36.61 | D12 (see table 8) | — | — |
| Object-side surface of the light reducing plate 50 | infinite | 0.20 | 1.52 | 64.2 |
| Image-side surface of the light reducing plate 50 | infinite | 0.10 | — | — |
| The surface of aperture stop 60 | infinite | 0.20 | — | — |
| Object-side surface of the eighth lens 31 | 46.08 | 1.22 | 1.52 | 64.1 |
| Image-side surface of the eighth lens 31 | −21.79 | 0.10 | — | — |
| Object-side surface of the ninth lens 32 | 7.28 | 2.94 | 1.75 | 52.3 |
| Image-side surface of the ninth lens 32 and object-side surface of the tenth lens 33 | −11.87 | 0.60 | 1.8 | 42.2 |
| Image-side surface of the tenth lens 33 | 6.50 | 2.65 | — | — |
| Object-side surface of the infrared cut filter 70 | infinite | 0.40 | 1.52 | 64.2 |
| Image-side surface of the infrared cut filter 70 | infinite | D21 (see table 8) | — | — |
| Object-side surface of the eleventh lens 41 | 10.91 | 2.24 | 1.59 | 61.1 |
| Image-side surface of the eleventh lens 41 and object-side surface of the twelfth lens 42 | −14.23 | 0.60 | 1.73 | 28.5 |
| Image-side surface of the twelfth lens 42 | 26.31 | 0.10 | — | — |
| Object-side surface of the thirteenth lens 43 | 18.10 | 1.70 | 1.52 | 64.1 |
| Image-side surface of the thirteenth lens 43 | −16.88 | D26 (see table 8) | — | — |
| Object-side surface of the glass cover | infinite | 0.55 | 1.52 | 64.2 |
| Image-side surface of the glass cover | infinite | 0.13 | — | — |
| Imaging plate 90 | infinite | — | — | — |

TABLE 7

| Surface | Aspherical coefficient |
|---|---|
| Object-side surface of the eighth lens 31 | K = 1.050854E+02; A4 = 3.324021E−05; A6 = 1.289642E−05; A8 = −8.496771E−07; A10 = 1.265576E−07; A12 = −3.167769E−09; |
| Image-side surface of the eighth lens 31 | K = −3.034905E+01; A4 = −1.109802E−04; A6 = 1.820651E−05; A8 = 5.215783E−07; A10 = 3.302673E−09; A12 = 1.511668E−09; |
| Object-side surface of the thirteenth lens 43 | K = −4.926205E+00; A4 = 1.528345E−04; A6 = 9.634109E−06; A8 = −1.686070E−07; A10 = 2.688698E−08; A12 = 2.366224E−10; |
| Image-side surface of the thirteenth lens 43 | K = −4.435138E+00; A4 = 1.866407E−04; A6 = 1.142809E−05; A8 = −1.490726E−07; A10 = 2.161677E−08; A12 = 6.414484E−10; |

TABLE 8

| Variable coefficient | Wide angle state | Middle state | Telephoto state |
|---|---|---|---|
| D5 | 0.90 | 14.00 | 18.77 |
| D12 | 21.37 | 8.27 | 3.49 |
| D21 | 6.32 | 2.34 | 1.16 |
| D26 | 8.82 | 12.79 | 13.97 |

Figure 13:
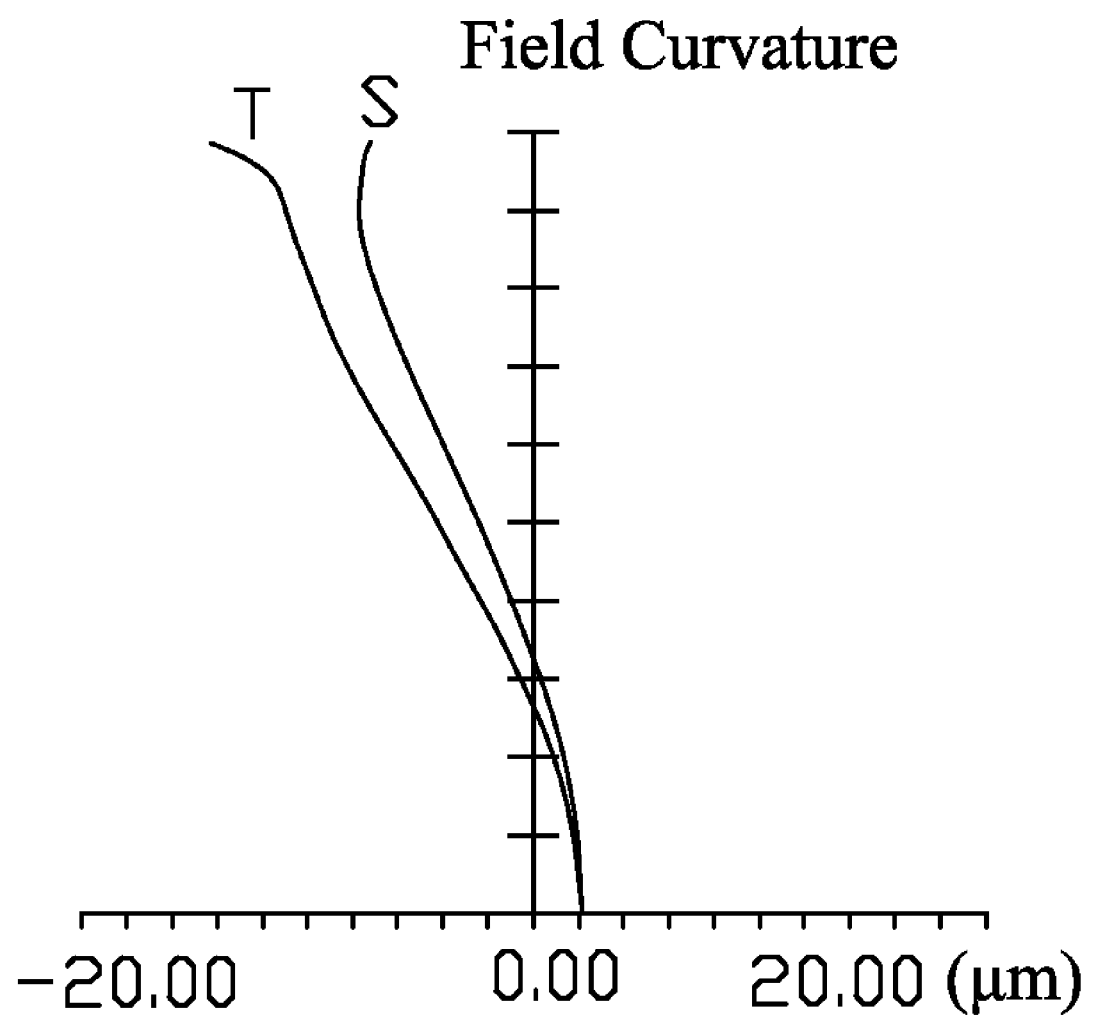
FIGS. 13~15 are graphs respectively showing field curvature, distortion, and spherical aberration occurring in the optical zoom lens module that is in the wide angle state as in FIG. 1, according to a second exemplary implementation.
Figure 14:
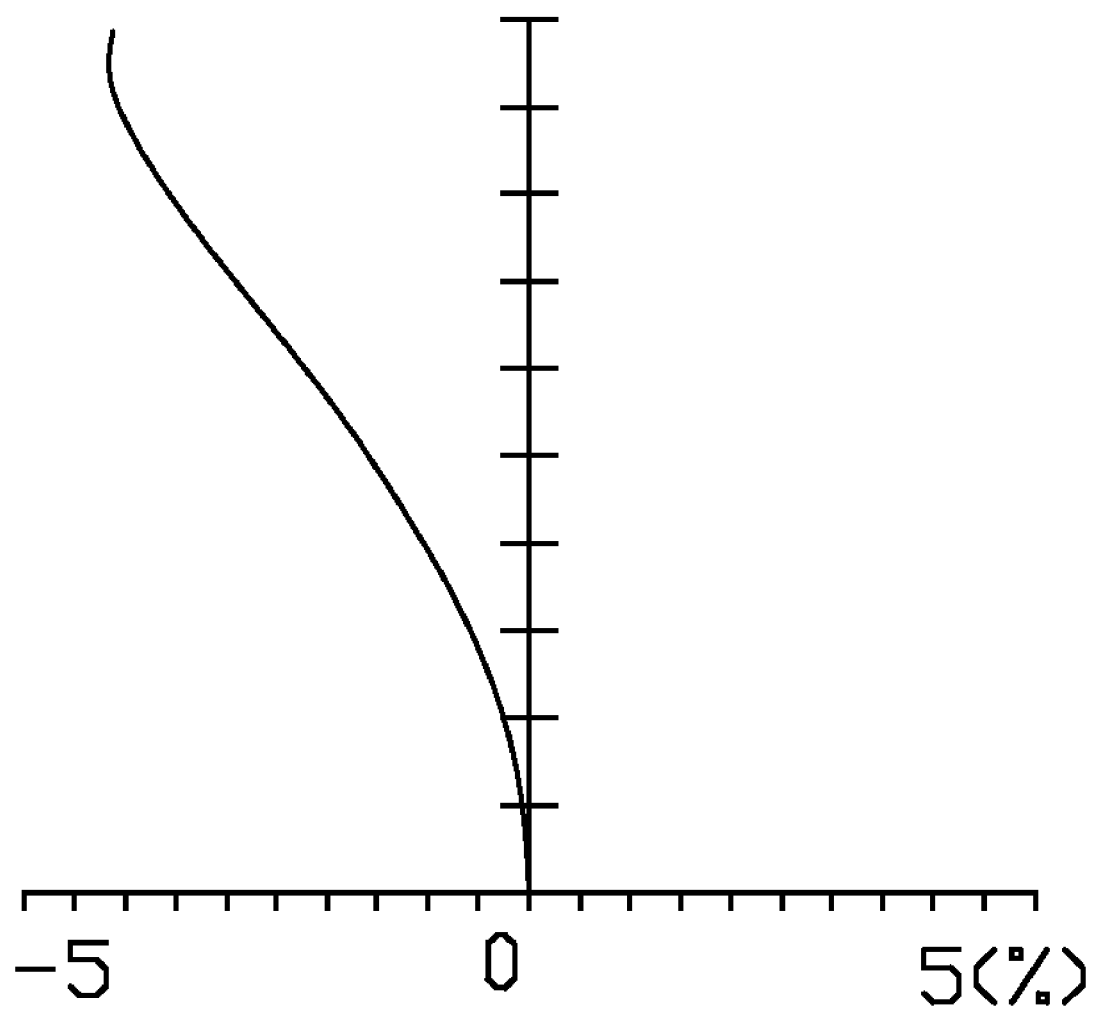
Figure 15:
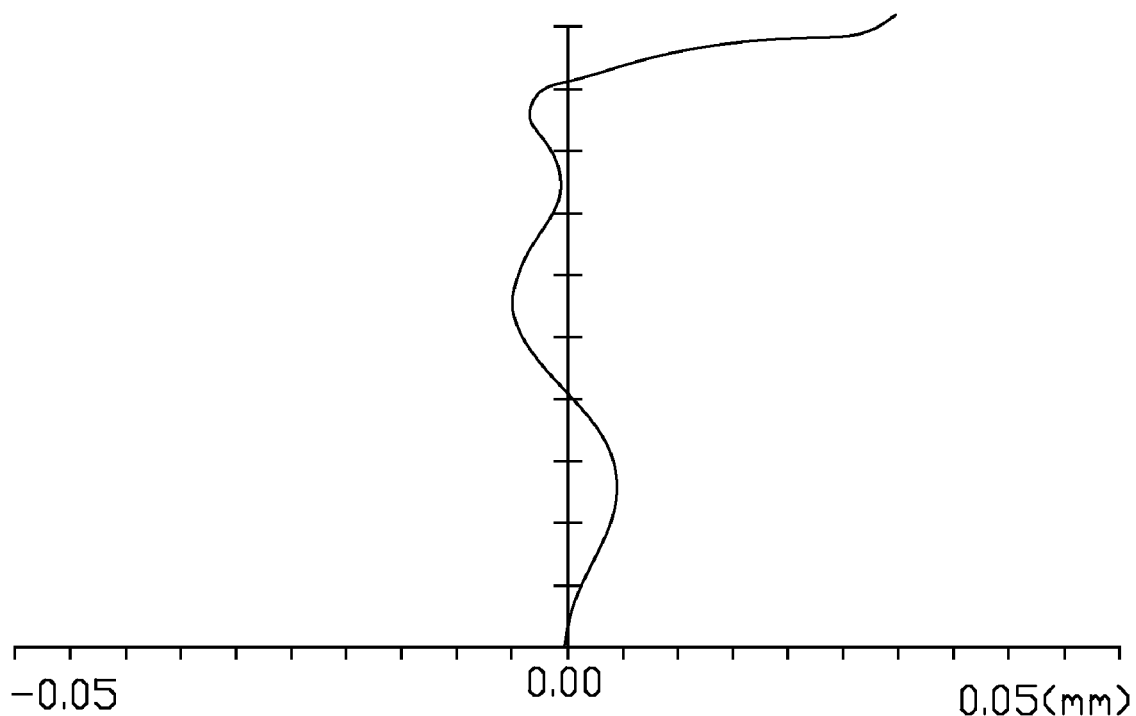

When the optical zoom lens module 100 is in wide angle state, in FIG. 13, the curves t, s are the tangential field curvature curve and the sagittal field curvature curve respectively. Clearly, field curvature occurring in the optical zoom lens module 100 of Example 2 is limited to a range of: −20 μm~20 μm. In FIG. 14, distortion occurring in the optical zoom lens module 100 of Example 2 is limited to be within the range of: −5%~5%. In FIG. 15, spherical aberration occurring in the optical zoom lens module 100 of Example 2 is limited in a range of −0.05 mm~0.05 mm.

Figure 16:
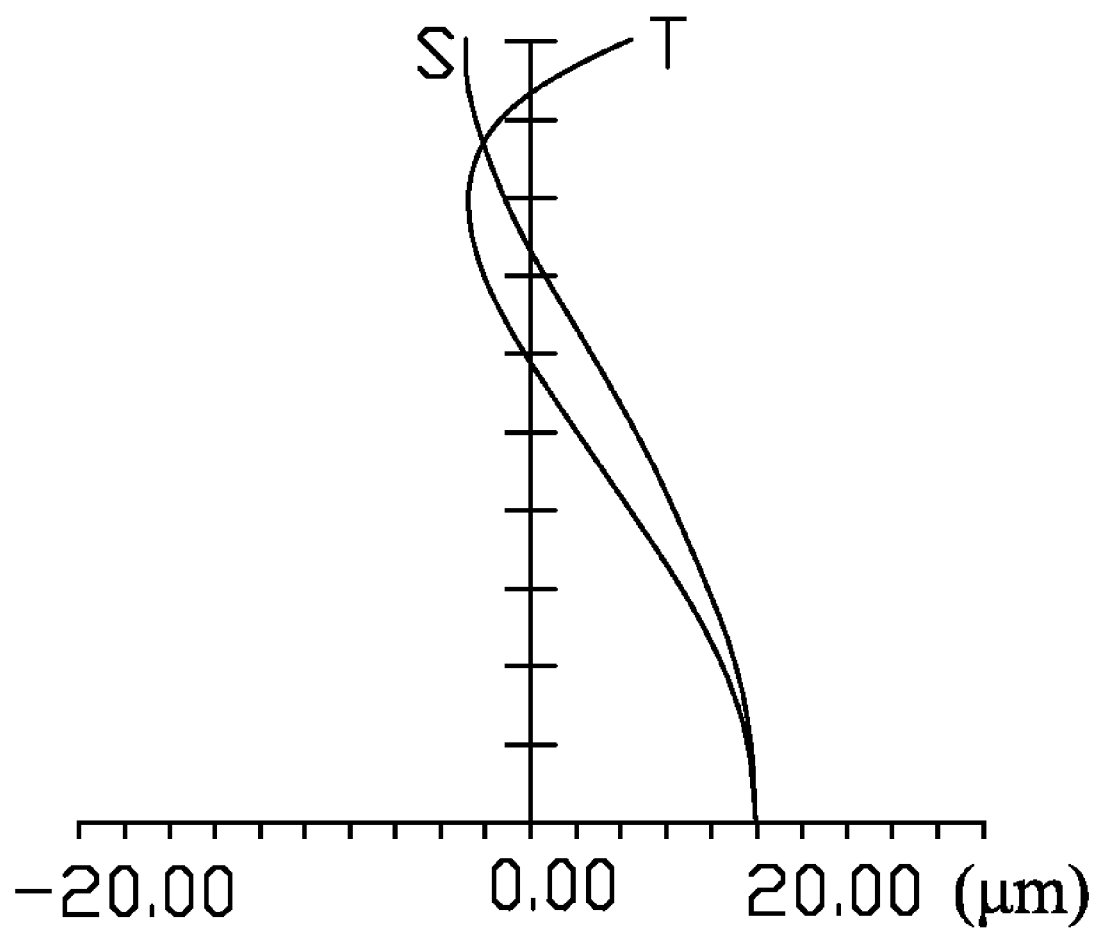
FIGS. 16~18 are graphs respectively showing field curvature, distortion, and spherical aberration occurring in the optical zoom lens module in the middle state as in FIG. 2, according to the second exemplary implementation.
Figure 17:
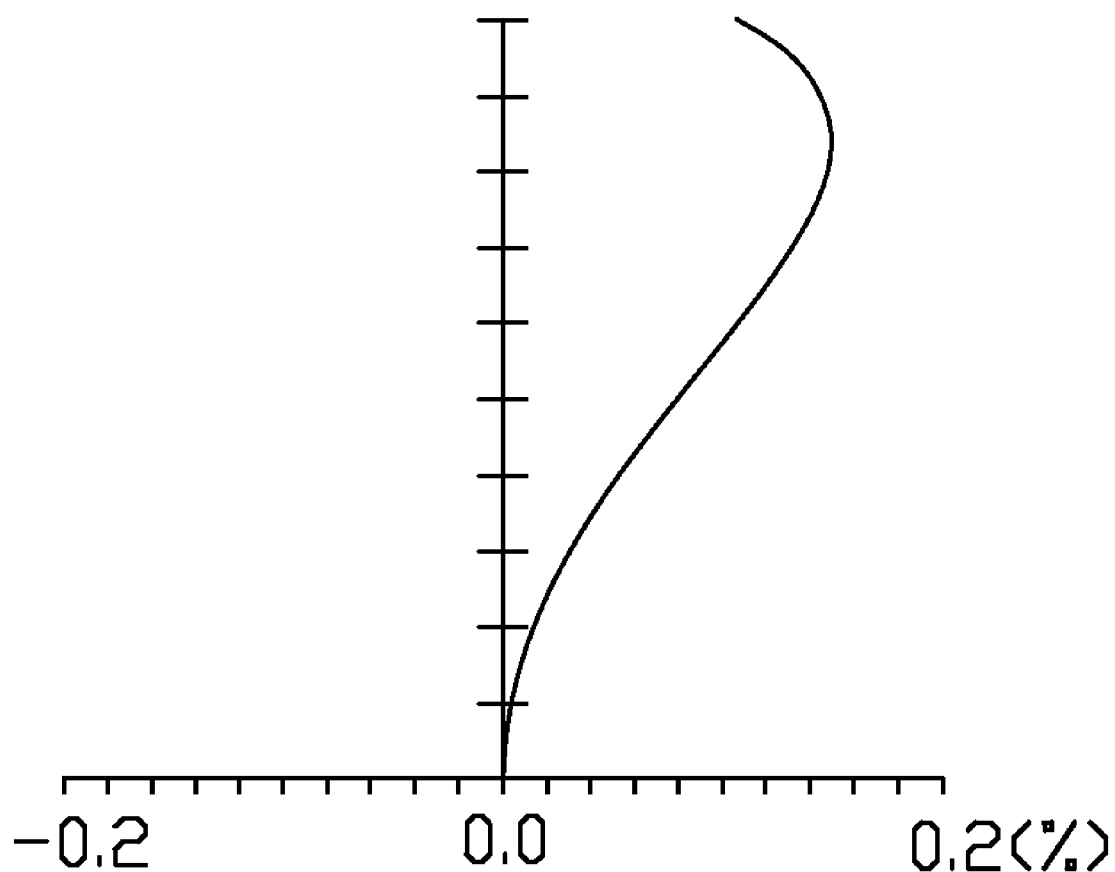
Figure 18:
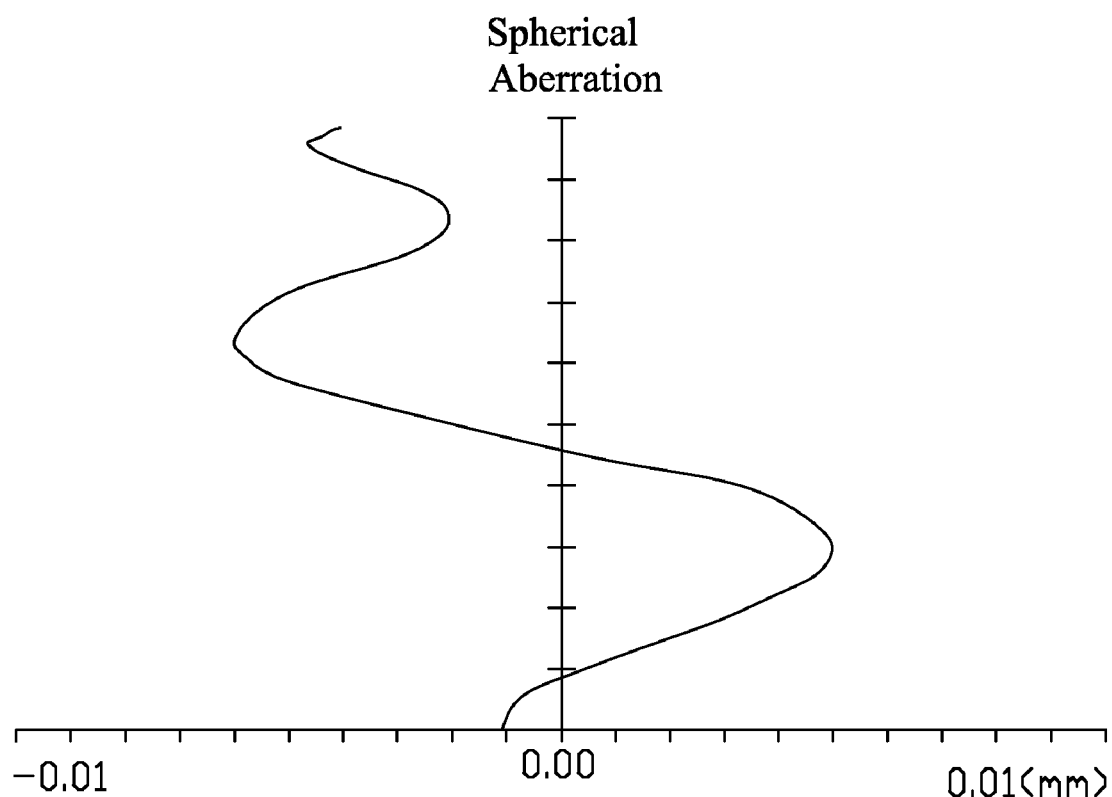

When the optical zoom lens module 100 is in middle state, in FIG. 16, the curves t, s are the tangential field curvature curve and the sagittal field curvature curve respectively. Clearly, field curvature occurring in the optical zoom lens module 100 of Example 2 is limited to a range of: −20 μm~20 μm. In FIG. 17, distortion occurring in the optical zoom lens module 100 of Example 2 is limited to be within the range of: −0.2%~0.2%. In FIG. 18, spherical aberration occurring in the optical zoom lens module 100 of Example 2 is limited in a range of −0.01 mm~0.01 mm.

Figure 19:
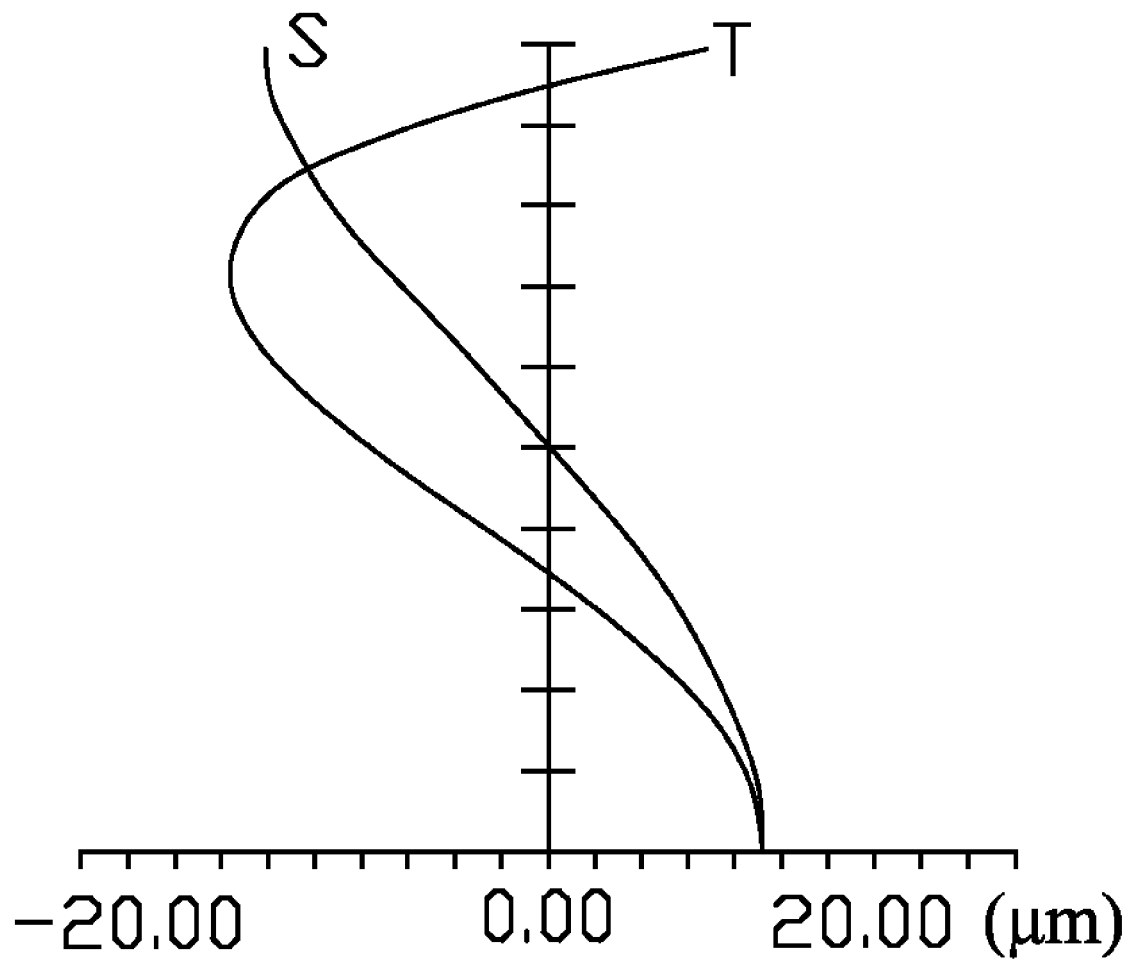
FIGS. 19~21 are graphs respectively showing field curvature, distortion, and spherical aberration occurring in the optical zoom lens module in the telephoto state as in FIG. 3, according to the second exemplary implementation.
Figure 20:
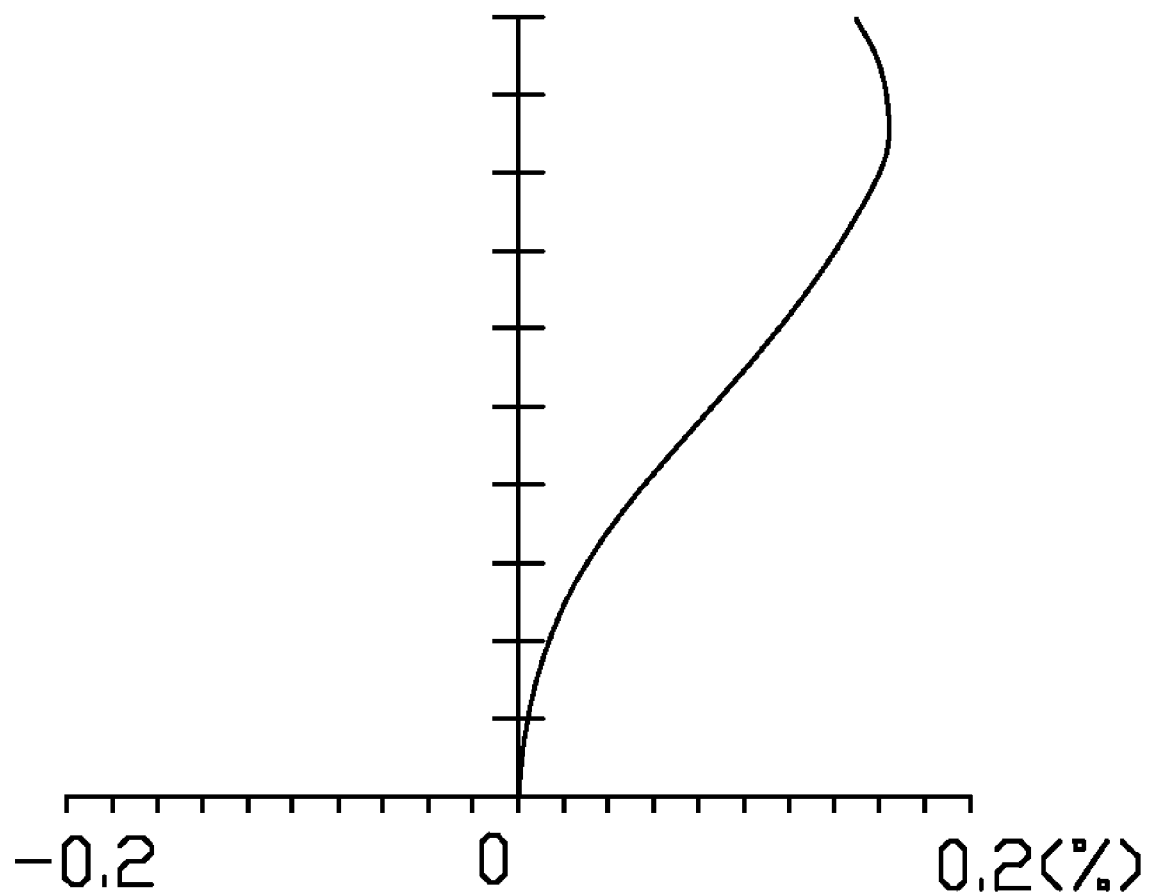
Figure 21:
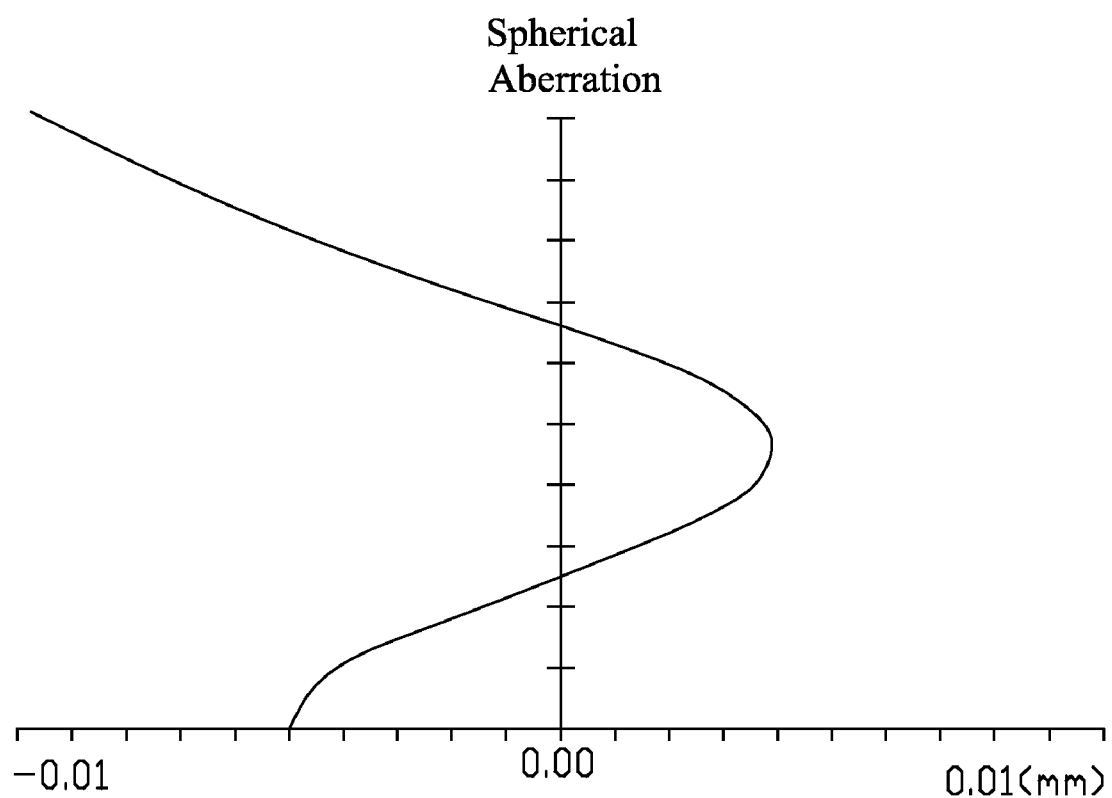

When the optical zoom lens module 100 is in telephoto state, in FIG. 19, the curves t, s are the tangential field curvature curve and the sagittal field curvature curve respectively. Clearly, field curvature occurring in the optical zoom lens module 100 of Example 2 is limited to a range of: −20 μm~20 μm. In FIG. 20, distortion occurring in the optical zoom lens module 100 of Example 2 is limited to be within the range of: −0.2%~0.2%. In FIG. 21, spherical aberration occurring in the optical zoom lens module 100 of Example 2 is limited in a range of −0.01 mm~0.01 mm.

In all, in Examples 1 and 2, the overall length of the optical zoom lens module 100 is short, and the optical zoom lens module 100 appropriately corrects fundamental aberrations. Therefore, a favorable optical performance of the optical zoom lens module 100 is obtained.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical zoom lens module comprising, in the order from the object side to the image side thereof:
   a first lens group of positive refraction power;
   a second lens group of negative refraction power;
   a third lens group of positive refraction power; and
   a fourth lens group of positive refraction power,
   wherein the optical zoom lens module satisfies the formulas: $12<TTL/FW<16$, and $6<F1/F<8$, where TTL is the total length of the optical zoom lens module, FW is the smallest effective focal length of the optical zoom lens module, F1 is the effective focal length of the first lens group, and F is the effective focal length of the optical zoom lens module.

2. The optical zoom lens module as claimed in claim 1, wherein the first lens group comprises, in the order from the object side to the image side of the optical zoom lens module, a first lens having negative refraction power, a second lens having positive refraction power, and a third lens having positive refraction power, and the first lens, the second lens, and the third lens are spherical lenses.

3. The optical zoom lens module as claimed in claim 2, wherein the optical zoom lens module further satisfies the formula: $30<(v2−v1)<60$ where v1 is the Abbe number of the first lens of the first lens group and v2 is the Abbe number of the second lens of the first lens group.

4. The optical zoom lens module as claimed in claim 2, wherein the optical zoom lens module further satisfies the formula: $-3<[ra+rb/ra-rb]<-1$, where ra is the curvature radius of the object-side surface of the third lens of the first lens group, and rb is the curvature radius of the image-side surface of the third lens of the first lens group.

5. The optical zoom lens module as claimed in claim 4, wherein the second lens group comprises, in the order from the object side to the image side of the optical zoom lens module, a fourth lens having negative refraction power, a fifth lens having negative refraction power, a sixth lens having positive refraction power, and a seventh lens having negative refraction power, and the fourth lens, the fifth lens, the sixth lens and the seventh lens are spherical lenses.

6. The optical zoom lens module as claimed in claim 5, wherein the third lens group comprises, in the order from the object side to the image side of the optical zoom lens module, an eighth lens having positive refraction power, a ninth lens having positive refraction power, and a tenth lens having negative refraction power, and at least one surface of the eighth lens is aspherical, and the ninth lens and the tenth lens are spherical lenses.

7. The optical zoom lens module as claimed in claim 6, wherein the fourth lens group includes, in the order from the object side to the image side of the optical zoom lens module, an eleventh lens having positive refraction power, a twelfth lens having negative refraction power, and a thirteenth lens having positive refraction power, and at least one surface of the thirteenth lens is aspherical, and the eleventh lens and the twelfth lens are spherical lenses.

8. The optical zoom lens module as claimed in claim 1, further comprising an infrared cut filter positioned between the third lens group and the fourth lens group.

9. The optical zoom lens module as claimed in claim 1, further comprising a light reducing plate positioned between the second lens group and the third lens group.

10. The optical zoom lens module as claimed in claim 9, further comprising an aperture stop positioned between the light reducing plate and the third lens group.

\* \* \* \* \*